(12) United States Patent
Bell et al.

(10) Patent No.: US 8,695,453 B2
(45) Date of Patent: Apr. 15, 2014

(54) LOCKOUT DEVICES FOR USE WITH ROTARY ACTUATORS

(75) Inventors: Brandon Wayne Bell, Marshalltown, IA (US); Lynn Dean Mahncke, Marshalltown, IA (US)

(73) Assignee: Fisher Controls International LLC, Marshalltown, IA (US)

( * ) Notice: Subject to any disclaimer, the term of this patent is extended or adjusted under 35 U.S.C. 154(b) by 155 days.

(21) Appl. No.: 13/042,926

(22) Filed: Mar. 8, 2011

(65) Prior Publication Data
US 2012/0227534 A1 Sep. 13, 2012

(51) Int. Cl.
*G05G 1/04* (2006.01)

(52) U.S. Cl.
USPC .......................................................... 74/519

(58) Field of Classification Search
USPC ........ 74/519, 523; 137/385; 70/177, 178, 195
See application file for complete search history.

(56) References Cited

U.S. PATENT DOCUMENTS

| | | | | |
|---|---|---|---|---|
| 2,748,794 A | * | 6/1956 | Dodds | 137/385 |
| 3,851,665 A | * | 12/1974 | Coughlin | 137/614.17 |
| 4,062,208 A | * | 12/1977 | Nielsen, Jr. | 70/178 |
| 4,614,203 A | * | 9/1986 | Russo | 137/385 |
| 4,926,900 A | * | 5/1990 | Pietras | 137/385 |
| 5,046,523 A | * | 9/1991 | Horhota | 137/385 |
| 5,115,834 A | | 5/1992 | Champagne | |
| 5,213,308 A | * | 5/1993 | Jeromson et al. | 251/95 |
| 5,823,023 A | * | 10/1998 | Benda | 70/180 |
| 6,994,106 B1 | * | 2/2006 | Hackley et al. | 137/385 |
| 2002/0078721 A1 | | 6/2002 | Vellette et al. | |
| 2005/0092367 A1 | | 5/2005 | Espinoza | |
| 2011/0140015 A1 | * | 6/2011 | Parsons et al. | 251/89 |

OTHER PUBLICATIONS

International Searching Authority, "Search Report," issued in connection with International Patent Application No. PCT/US2012/023816, mailed on Jul. 2, 2012, 2 pages.
International Searching Authority, "Written Opinion," issued in connection with International Patent Application No. PCT/US2012/023816, mailed on Jul. 2, 2012, 4 pages.

* cited by examiner

*Primary Examiner* — Vicky Johnson
(74) *Attorney, Agent, or Firm* — Hanley, Flight and Zimmerman, LLC (57) ABSTRACT

Lockout devices for use with rotary actuators are described. An example lockout device for use with a rotary actuator includes an insert including a first portion to be inserted into a lever of the rotary actuator, the insert to interact with one or more features of the lever to enable rotational movement of the lever to be transmitted thereto. The lockout device includes a second portion of the insert to extend from the lever, the second portion defining an opening through which an object is to be inserted to rotationally fix the insert and the lever in a first position relative to a housing of the rotary actuator.

22 Claims, 12 Drawing Sheets

LOCKOUT DEVICES FOR USE WITH ROTARY ACTUATORS

FIELD OF THE DISCLOSURE

This patent relates to lockout devices and, more specifically, to lockout devices for use with rotary actuators.

BACKGROUND

Process control systems use a variety of field devices to control process parameters. Rotary actuators are one type of field device that is commonly used to control process parameters. For safety reasons, when maintenance is performed on the system in which these rotary actuators are used, the rotary actuator may be locked out by securing the actuator lever in the upmost position.

SUMMARY

An example lockout device for use with a rotary actuator includes an insert including a first portion to be inserted into a lever of the rotary actuator, the insert to interact with one or more features of the lever to enable rotational movement of the lever to be transmitted thereto. The lockout device includes a second portion of the insert to extend from the lever, the second portion defining an opening through which an object is to be inserted to rotationally fix the insert and the lever in a first position relative to a housing of the rotary actuator.

An example lockout assembly to be used with a rotary actuator includes a plate to be coupled to a housing of the rotary actuary, the plate defining an aperture therethrough and a slot, and an insert including a first portion and a second portion. The first portion to be inserted into a lever of the rotary actuator and the second portion to be positioned within the aperture, the insert having a cross-section configured to engage the lever to enable rotational movement of the lever to be transmitted thereto. The second portion defining a slot to be aligned with the slot of the plate to enable an object to be inserted into the slots to prevent rotationally movement of the insert and the lever relative to the plate.

An example rotary actuator includes a housing and a lockout device including an insert. The rotary actuator includes a lever disposed within the housing and configured to receive a shaft associated with a valve on a first side of the lever and the insert on a second side of the lever. The insert to interact with the lever and an opening in the housing to rotationally fix the insert and the lever during a lockout procedure.

DETAILED DESCRIPTION

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to example lockout or locking devices that enable rotary actuators with which they are used to be locked, secured and/or fixed in multiple positions (e.g., a closed position, an open position, a 50% open position, etc.) during a lockout procedure. The examples described herein may be used in connection with any suitable actuator such as a rack and pinion rotary actuator, a rotary actuator, etc. In contrast to some known lockout devices, the example lockout devices described herein substantially prevent rotational movement of an actuator lever in both directions (e.g., a clockwise direction and a counter-clockwise direction) during a lockout procedure. The example lockout device may be installed on existing rotary actuators without substantial, if any, alteration. Thus, existing rotary actuators may be provided with the benefits of the example lockout devices described herein without incurring the cost of replacing or substantially modifying the actuator.

The example lockout devices described herein may include an insert, a locking pin and a mounting plate in which the insert is at least partially positioned. The mounting plate may be mounted to an actuator housing and/or an end plate using existing tapped holes to position the lockout device adjacent the actuator lever. The lockout device may be positioned on a side of the actuator opposite the side to which the valve is coupled. Because a first portion of the insert is to interact with or engage splines and/or features of the actuator lever and these splines and/or features may be differently positioned (e.g., +/−7°) depending on the zero position of the valve to which the actuator is coupled, the mounting plate may define slotted holes to enable the position of the mounting plate to vary relative to the actuator based on the zero position of the valve. Thus, in some examples, the mounting plate may be skewed or rotated relative to the actuator housing. However, in other examples, the mounting plate may be integral with the actuator housing and/or the end plate.

The first portion of the insert may have a substantially square cross-section or any other suitable cross-section (e.g., triangular, splines, etc.) to interact with or engage inward facing splines and/or surface structures of an actuator lever and enable rotational movement of the lever to be transmitted to the insert. In some examples, the square cross-section may have chamfered corners that are positioned within grooves defined by the inward facing splines. Chamfering the corners of the insert may enable the insert to be manufactured using tighter tolerances while still enabling the insert to be easily insertable into the lever, for example. In other examples, the insert may be integrally coupled to the lever. In some examples, the insert may enable the lever to be fixed in one or more positions by interacting with a structure, gear, shaft, etc., coupled to and/or extending from the lever. Thus, in some examples, the insert may not be directly received by the lever.

The insert may additionally include a second portion from which the first portion extends. The second portion may have a circular cross-section and may be positioned within the mounting plate. In some examples, the mounting plate, the end plate and/or the housing and the second portion define openings and/or apertures that, when aligned, enable a locking pin to be inserted therethrough and prevent rotational movement of the insert and, in turn, the lever by the interaction between the insert and the inward facing splines of the lever.

The locking pin may include a shoulder that separates a larger diameter portion from a smaller diameter portion. The locking pin shoulder may engage a corresponding shoulder within the opening and/or aperture to prevent further movement of the locking pin once the pin is fully positioned within the mounting plate. In some examples, the smaller diameter portion of the locking pin may define a through hole in which a portion of a retaining device (e.g., a lock) may be positioned during a lockout procedure to prevent removal of the locking pin from the respective openings or apertures. Alternatively, the locking pin may have a head that engages a surface of the mounting plate, end plate and/or housing to prevent further movement of the locking pin once the pin is fully positioned within the mounting plate, the end plate and/or the housing.

The position at which rotational movement of the lever may be prevented may vary depending on the position of the lever when the first portion of the insert is inserted therein. For example, if the lever is in a fully-closed position when the insert having its aperture aligned with the aperture of the mounting plate is inserted into the lever, the lever may be rotationally fixed or secured in the fully-closed position during a lockout procedure. Alternatively, if the lever is in a fully-open position when the insert having its aperture aligned with the aperture of the mounting plate is inserted into the lever, the lever may be rotationally fixed or secured in the fully-open position during a lockout procedure.

In other examples, the mounting plate and the second portion define openings and/or slots that, when aligned, enable a key (e.g., a square or rectangular elongate member) to be inserted therein and prevent rotational movement of the insert and, in turn, the lever by the interaction between the insert and the inward facing splines of the lever. In other examples, the second portion may define two or more openings, apertures and/or slots that, when respectively aligned with the opening, aperture and/or slot defined by the mounting plate, enable the insert and, in turn, the lever, to be rotationally fixed or secured in more than one position. For example, if a first of the insert openings is aligned with the opening of the mounting plate and an object (e.g., locking pin, key, etc.) is inserted therein, the insert and the lever may be rotationally secured in a first position. The first position may correspond to a fully-closed position of a valve coupled to the actuator. If a second of the insert openings is aligned with the opening of the mounting plate and the object is inserted therein, the insert and the lever may be rotationally secured in a second position. The second position may correspond to a 50% open position of the valve coupled to the actuator, for example. However, the first and/or second positions may correspond to any other valve position (e.g., fully open, fully closed, 50%, etc.).

To axially retain the insert within the mounting plate, a travel scale or retainer may be coupled to the mounting plate. The travel scale may cover an end of an aperture in which the second portion of the insert is positioned. In some examples, the travel scale may be ring shaped (e.g., annular) and coaxially aligned with the insert. In such examples, an inner diameter of the travel scale may be smaller than an outer diameter of the insert to prevent the insert from falling out of the mounting plate. Because during normal operation the insert rotates along with the lever, a travel indicator (e.g., an arrow) may be coupled to an exterior surface of the insert. As the lever rotates, the travel indicator may visually indicate the position of the valve on the adjacent travel scale. Alternatively, the mounting plate may include a lip to axially retain the insert within the mounting plate.

In some examples, to store the locking pin or key when not in use (e.g., other than a lockout procedure), the mounting plate may define an aperture into which the locking pin or key may be inserted. To secure the locking pin or key within the aperture, a clip pin may be positioned in the aperture to secure the locking pin or key therein. In some examples, to not interfere with the depth that apertures used to secure accessory devices to the mounting plate may be drilled, the aperture used to store the locking pin may have a longitudinal axis in a first plane of the mounting plate and the aperture used during a lockout procedure may have a longitudinal axis in a second plane of the mounting plate. The accessory devices may include a positioner, a travel beacon, a limit switch, etc.

In other examples, the insert may only be positioned within the actuator lever during a lockout procedure to rotationally fix or secure the lever relative to the actuator housing. In such examples, the mounting plate, the end plate and/or the housing may define an aperture having a geometry (e.g., splines, square, rectangular, etc.) that corresponds to a cross-section of the second portion of the insert. For example, the first portion of the insert being inserted into the lever may have a substantially square cross-section that interacts with inward facing splines of the lever and the second portion of the insert extending from the lever may also have a square cross-section that corresponds to a square and/or splined aperture defined by the mounting plate. During normal operation when the insert is not positioned within the actuator lever, a cover or flap (e.g., travel indicator) may be positioned over the opening defined by the actuator housing adjacent the actuator lever to substantially prevent debris from entering the actuator housing and/or the lever.

Figure 1:
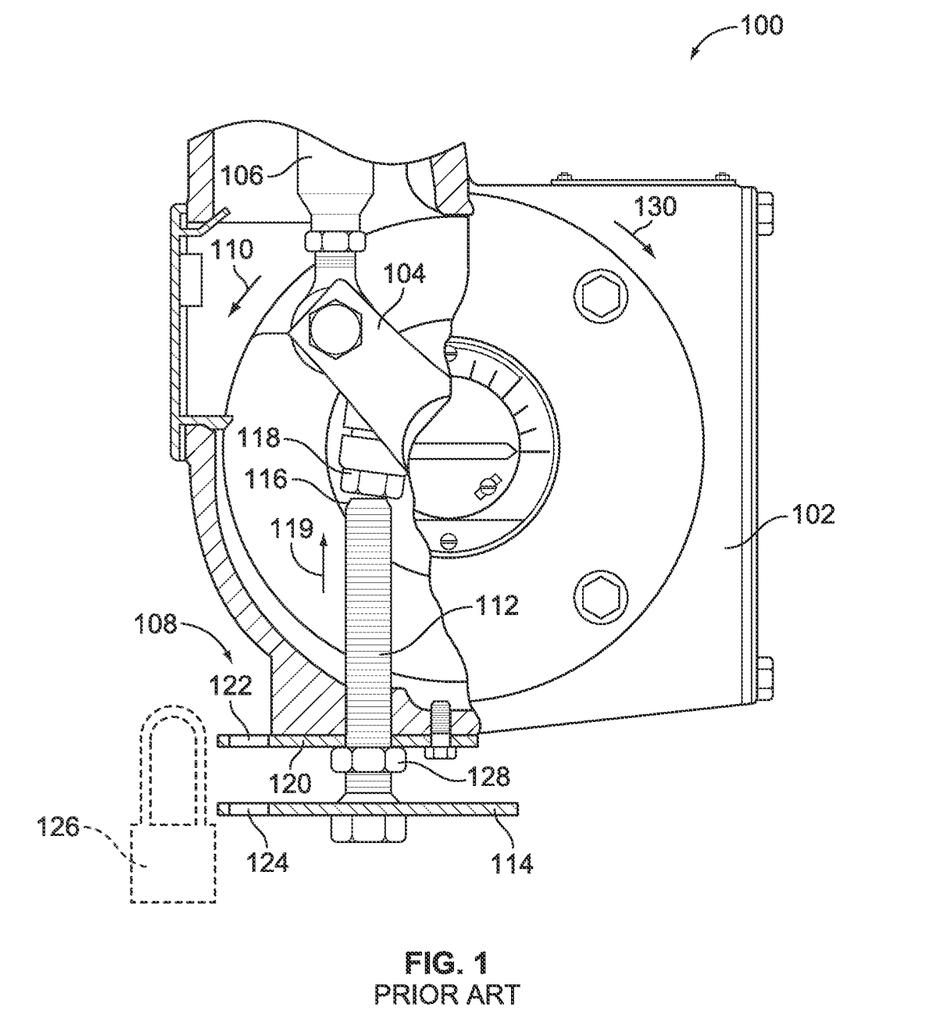
FIG. 1 depicts a partial cutaway view of a portion of a known rotary actuator.

FIG. 1 depicts a partial cutaway view of a portion of a rotary actuator 100 including a housing 102 and a lever 104. The lever 104 is coupled to an actuator rod 106 and is configured to receive a valve shaft (not shown). The coupling between the actuator rod 106 and the lever 104 enables linear displacement of the actuator rod 106 to be converted into rotational movement of the lever 104, the valve shaft and a valve member (not shown) coupled thereto.

The actuator 100 additionally includes a lockout assembly 108 to prevent movement of the lever 104 in a direction generally indicated by arrow 110 (e.g., counter-clockwise) during a lockout procedure. The lockout assembly 108 includes a threaded stud 112 having a locking disc 114. The stud 112 extends through a bottom portion of the housing 102 and includes an end 116 configured to engage a cap screw 118 of the lever 104 during the lockout procedure. The engagement between the stud 112 and the lever 104 prevents the lever 104 from moving in the direction generally indicated by arrow 110. To prevent unauthorized movement of the stud 112 during the lockout procedure, the housing 102 includes an extension 120 coupled thereto defining an aperture 122 that is aligned with an aperture 124 of the locking disk 114. Once the stud 112 engages the cap screw 118 and the apertures 122 and 124 are aligned, a portion of a lock 126 may be positioned through the apertures 122 and 124.

During a lockout procedure, the actuator rod 106 may position the lever 104 in the upmost position (as depicted in FIG. 1) and the stud 112 may be moved in a direction generally indicated by arrow 119 until the end 116 engages the cap screw 118. A jam nut 128 may then be moved to engage the housing 102 to further secure the stud 112 relative to the housing 102. Additionally, the portion of the lock 126 may be positioned through the corresponding apertures 122 and 124 to prevent unauthorized movement of the stud 112.

The engagement between the stud 112 and the lever 104 prevents the lever 104 from moving in the direction generally indicated by arrow 110 (e.g., counter-clockwise). However, this engagement does not prevent the lever 104 from moving in a direction generally indicated by arrow 130 (e.g., clockwise). For the stud 112 to properly engage the lever 104, the lever 104 must be in the upmost position (as depicted in FIG. 1), which limits the lever 104 to being locked out in only one position. The upmost position of the lever 104 may correspond to the valve coupled to the actuator 100 being in the fully-open position or the fully-closed position.

Figure 2:
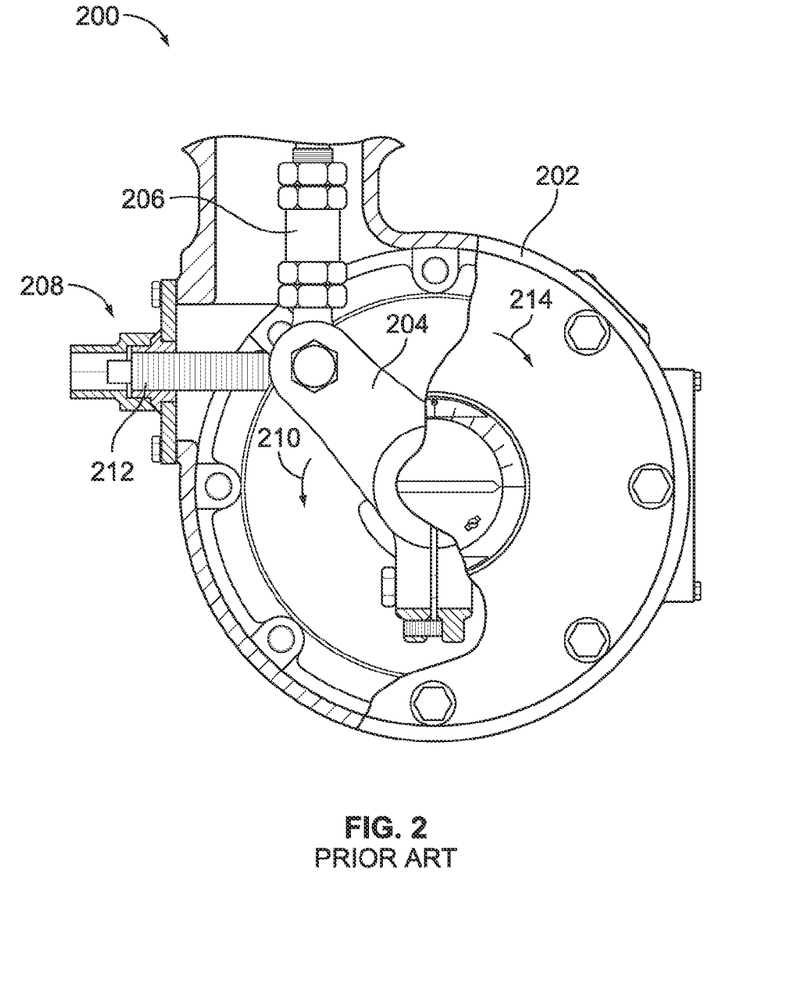
FIG. 2 depicts a partial cutaway view of a portion of another known rotary actuator.

FIG. 2 depicts a partial cutaway view of a portion of a rotary actuator 200 that is similar to the actuator 100. The actuator 200 includes a housing 202 and a lever 204. The lever 204 is coupled to an actuator rod 206 and is configured to receive a valve shaft (not shown). The coupling between the actuator rod 206 and the lever 204 enables linear displacement of the actuator rod 206 to be converted to rotational movement of the lever 204, the valve shaft and a valve member (not shown) coupled thereto.

The actuator 200 additionally includes a lockout assembly 208 to prevent movement of the lever 204 in a direction generally indicated by arrow 210 (e.g., counter-clockwise) during a lockout procedure. Instead of being positioned on the bottom of the housing 202 as with the lockout assembly 108 of FIG. 1, the lockout assembly 208 is positioned on the side of the housing 202. Otherwise, the functionality of the lockout assembly 208 is similar to the lockout assembly 108.

The lockout assembly 208 includes a threaded stud 212 that extends through the housing 202 to engage the lever 204 and prevent rotation of the lever 204 in the direction generally indicated by arrow 210 during a lockout procedure. However, as with the lockout assembly 108 of FIG. 1, the engagement between the stud 212 and the lever 204 does not prevent movement of the lever 204 in a direction generally indicated by arrow 214 (e.g., clockwise). Also, as with the lockout assembly 108 of FIG. 1, the lever 204 must be positioned in the upmost position (depicted in FIG. 2) for the stud 212 to properly engage the lever 204.

Figure 3:
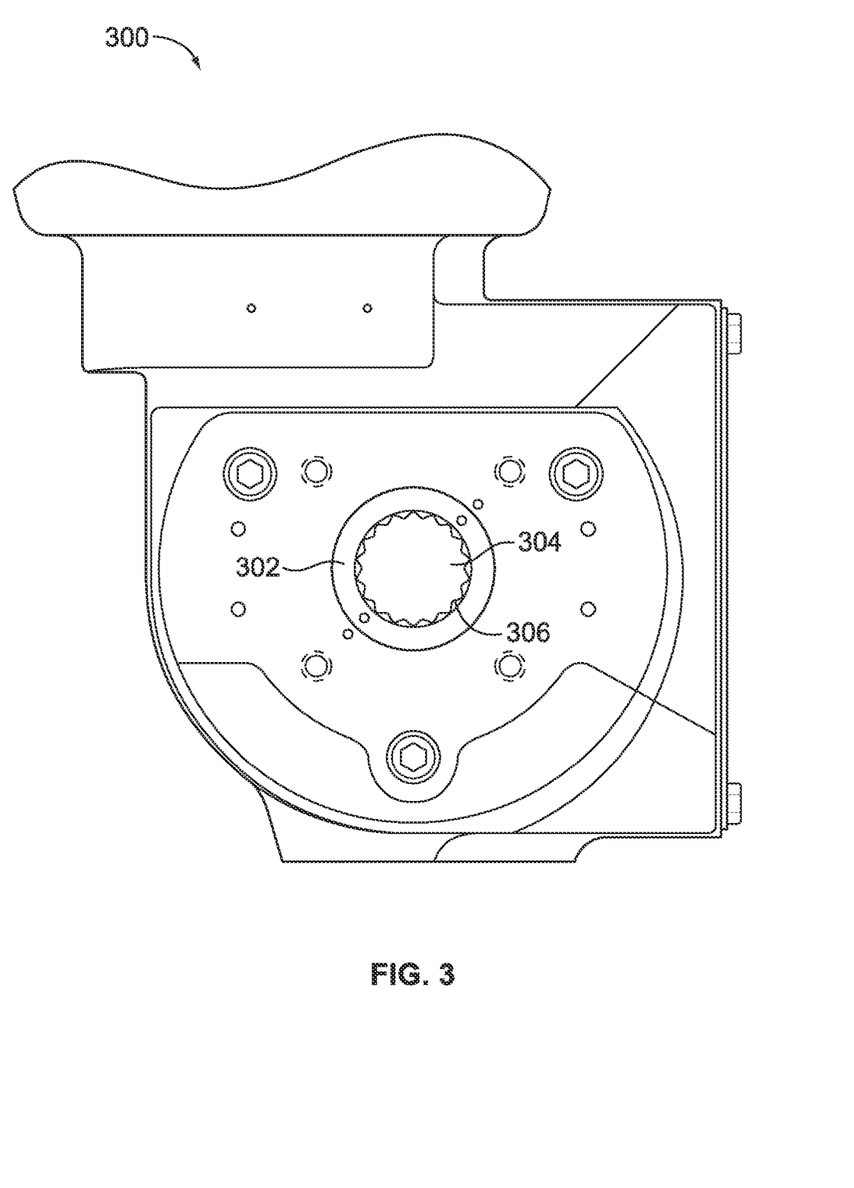
FIG. 3 depicts a portion of an actuator.

FIG. 3 depicts a portion of an actuator 300 including a lever 302 disposed therein. The lever 302 includes opposing apertures 304 (one of which is not shown) to enable a valve to be mounted on either side of the actuator 300. Inward facing splines and/or features 306 positioned within the apertures 304 and/or other interior splines of the lever 302 are configured to interact with a valve shaft to transmit rotational movement of the lever 302 to the valve shaft. Additionally, the splines 306 of the aperture 304 not receiving the valve shaft may interact with an example lockout device to transmit rotational movement of the lever 302 to the lockout device. Because the rotational movement of the lever 302 is transmitted to the lockout device, preventing movement of the lockout device also prevents movement of the lever 302.

Figure 4:
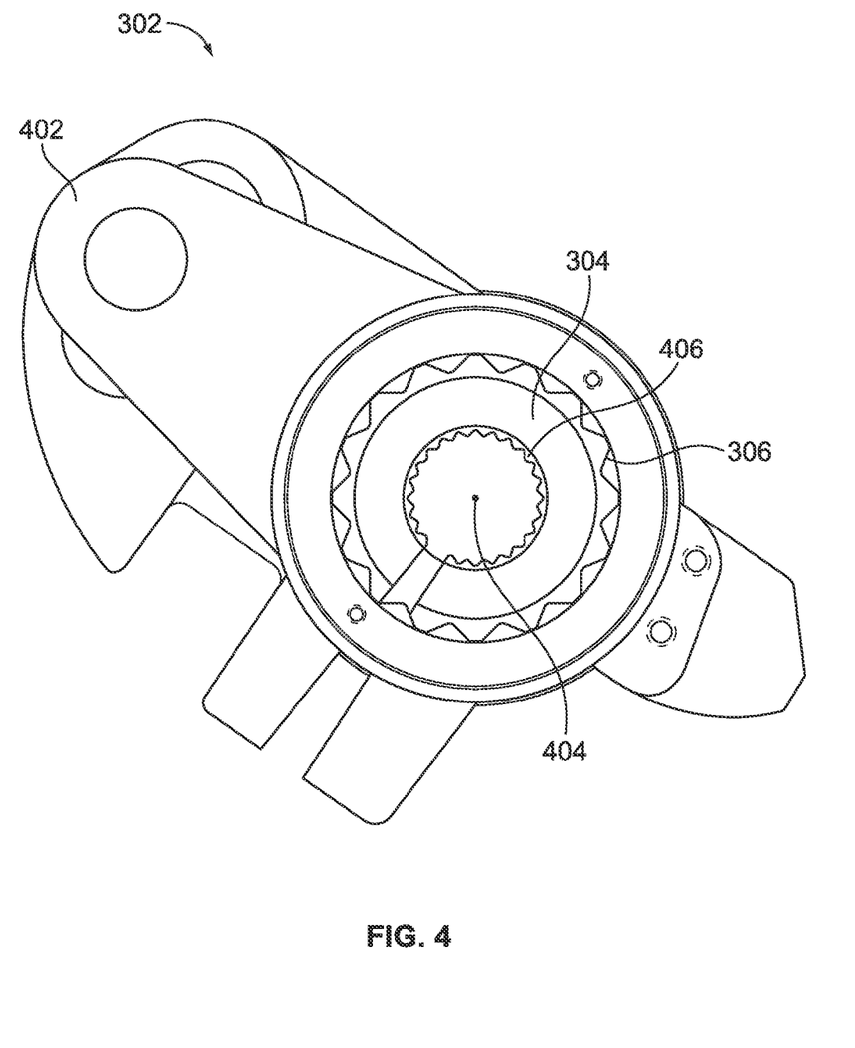
FIG. 4 depicts an actuator lever.

FIG. 4 depicts a more detailed view of the lever 302, the aperture 304 and the splines 306. A lever arm 402 of the lever 302 may be coupled to an actuator rod (not shown) that enables linear movement of the actuator rod to be converted into rotational movement of the lever 302 about an axis 404. The lever 302 includes interior splines 406 that may interact with a valve shaft to transmit rotational movement of the lever 302 to the valve shaft.

Figure 5:
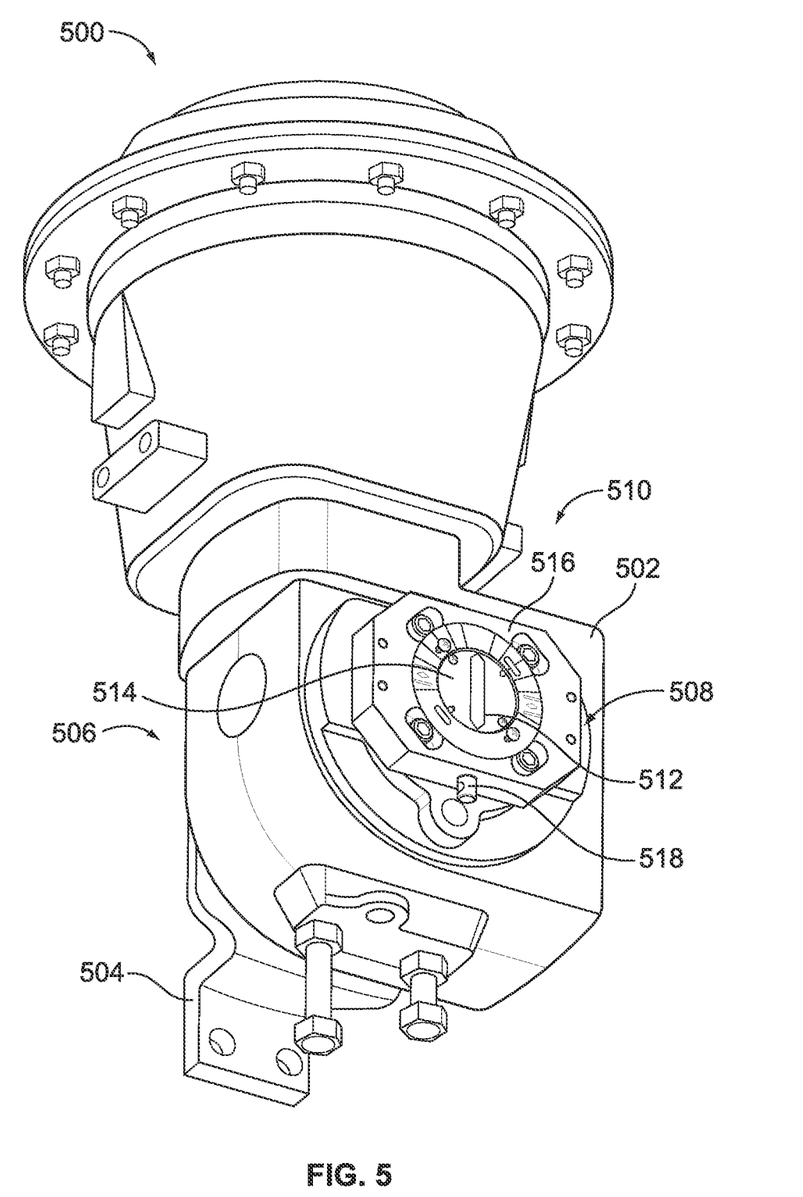
FIG. 5 depicts an example rotary actuator including an example lockout device.

FIG. 5 depicts an example actuator 500 including a housing 502. A mounting bracket or yoke 504 is mounted to a first side 506 of the housing 502 and an example lockout device or assembly 508 is mounted to a second side 510 of the housing 502. The lockout device 508 includes an insert 512 having a travel indicator 514 coupled thereto. Additionally, the lockout device 508 includes a mounting plate 516 in which the insert 512 is at least partially positioned and a locking pin 518. The locking pin 518 extends through apertures defined by the insert 512 and the mounting plate 516 to substantially secure or fix (i.e., prevent rotation of) the insert 512 relative to the mounting plate 516.

Figure 6:
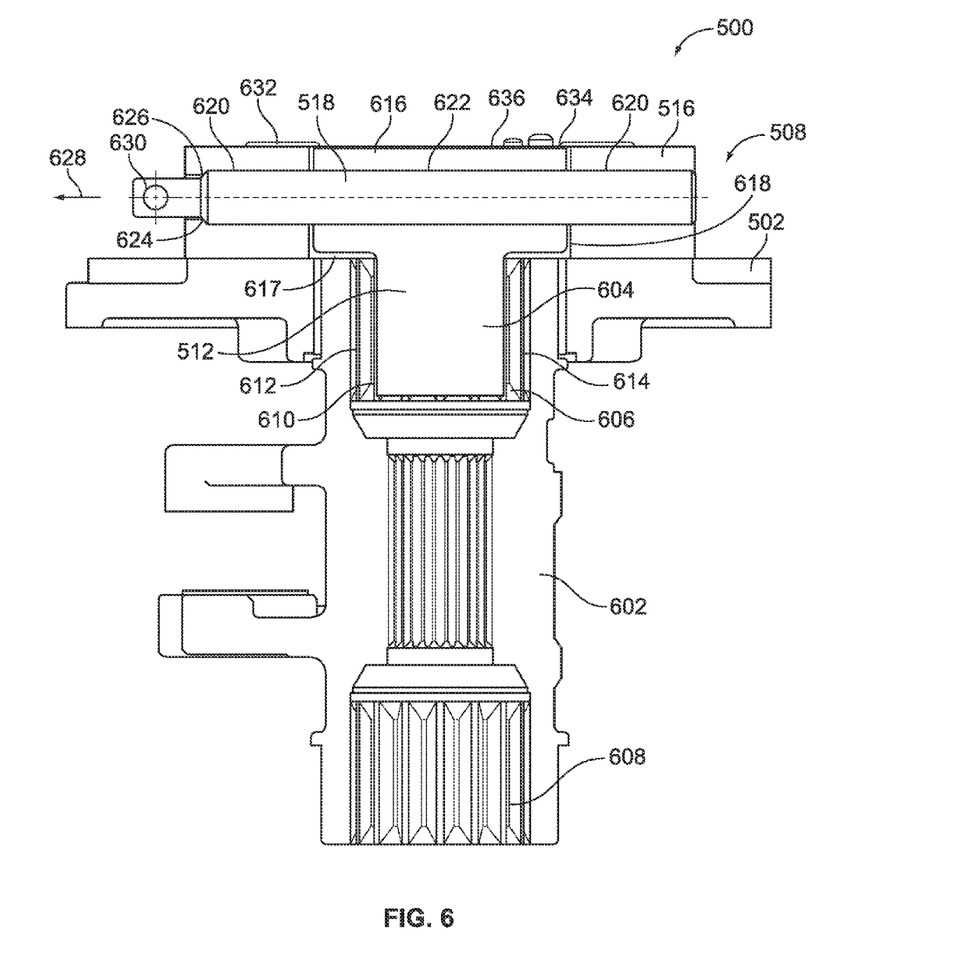
FIG. 6 depicts a cross-sectional view of the example actuator and the example lockout device of FIG. 5.

FIG. 6 depicts a cross-sectional view of a portion of the actuator 500 including an actuator lever 602, the housing 502 and the example lockout device 508. The lockout device 508 includes the insert 512, the mounting plate 516 and the locking pin 518.

The insert 512 may include a first portion 604 that extends into a first aperture 606 of the lever 602. The first aperture 606 is opposite a second aperture 608 of the lever 602 in which a valve shaft (not shown) is to be positioned. However, the first portion 604 may instead be positioned in the second aperture 608 and the valve shaft may be positioned in the first aperture 606.

The first portion 604 includes surface structures (e.g., corners) 610 that are received by one or more grooves 612 defined by splines 614 within the first aperture 606. The interaction between the surface structures 610 and the splines 614 enable rotational movement of the lever 602 to be transmitted to the insert 512. Thus, as the lever 602 rotates to change the position of the valve coupled to the actuator 500, the insert 512 also rotates. In some examples, the first portion 604 may have a substantially square cross-section, a triangular cross-section, a circular cross-section having splines, etc.

The insert 512 additionally includes a second portion 616 that is at least partially positioned within an aperture 618 of the mounting plate 516. The second portion 616 may have a cross-sectional shape that enables the insert 512 to freely rotate within the aperture 618 when the locking pin 518 does not extend through the insert 512 and the mounting plate 516. In some examples, the second portion 616 may have a circular cross-section that corresponds to and engages a portion or end 617 of the lever 602 having a circular cross-section when the lockout device 508 is mounted to the housing 502.

The mounting plate 516 and the second portion 616 define apertures 620 and 622 that, when aligned, enable the locking pin 518 to be inserted therethrough and prevent rotational movement of the insert 512 relative to the mounting plate 516. Because the first portion 604 is positioned within the lever 602 such that rotational movement of the lever 602 is transmitted to the insert 512 in both directions (e.g., clockwise, counter-clockwise), preventing rotational movement of the insert 512 in both directions also prevents rotational movement of the lever 602 in both directions.

Once the locking pin 518 is positioned within the apertures 620 and 622, a shoulder 624 of the locking pin 518 may engage a corresponding shoulder 626 of the mounting plate 516 to prevent additional movement of the locking pin 518 in a direction generally indicated by arrow 628. A lock (not shown) may then be positioned in a through hole 630 of the locking pin 518 to prevent removal of the locking pin 518.

Unlike the lockout assemblies 108 and 208 described above that are limited to securing an actuator in the upmost position, the lockout device 508 may be used to rotationally secure or fix the lever 602 in any position (e.g., a closed position, an open position, or any other position between fully-open and fully-closed). For example, by positioning the lever 602 in a desired lockout position and then mounting the lockout device 508 to the housing 502, the lever 602 may be secured in that position during a lockout procedure using the locking pin 518, for example. If the lockout device 508 with the apertures 620 and 622 aligned and the locking pin 518 inserted is mounted to the housing 502 when the lever 602 is in the fully-closed position, the lever 602 may be rotationally secured in the fully-closed position using the locking pin 518. If the lockout device 508 with the apertures 620 and 622 aligned and the locking pin 518 inserted is mounted to the housing 502 when the lever 602 is in the fully-open position, the lever 602 may be rotationally secured in the fully-open position using the locking pin 518. In other examples, the insert 512 may define additional apertures (e.i. 1302 of FIG. 13) to be aligned with the aperture 620 of the mounting plate 516 to enable the lever 602 to be secured in more than one position without removing and reinstalling the lockout device 508 to the housing 502. In some examples, there may be four squares broached in the first aperture 606 (e.g., to form the splines 614). Thus, if the first portion 604 has a square cross-section, the insert 512 may be positioned within the lever 602 four different ways enabling the lockout device 508 to be mounted differently relative to the housing 502 than depicted.

To axially retain the insert 512 within the mounting plate 516, a travel scale 632 may be coupled to the mounting plate 516. A lip or edge 634 of the travel scale 632 may retain the second portion 616 of the insert 512 within the aperture 618. In some examples, the travel scale 632 may be ring shaped and axially aligned with the insert 512. In such examples, the travel scale 632 may have an inner diameter that is smaller than an outer diameter of the second portion 616 of the insert 512 to retain the insert 512 within the aperture 618. Because the insert 512 rotates along with the lever 602, a travel indicator 636 may be coupled to the insert 512 to indicate a valve position on the adjacent travel scale 632. Alternatively, the mounting plate 516 may include a lip (not shown) to axially retain the insert 512 within the mounting plate 516.

Figure 7:
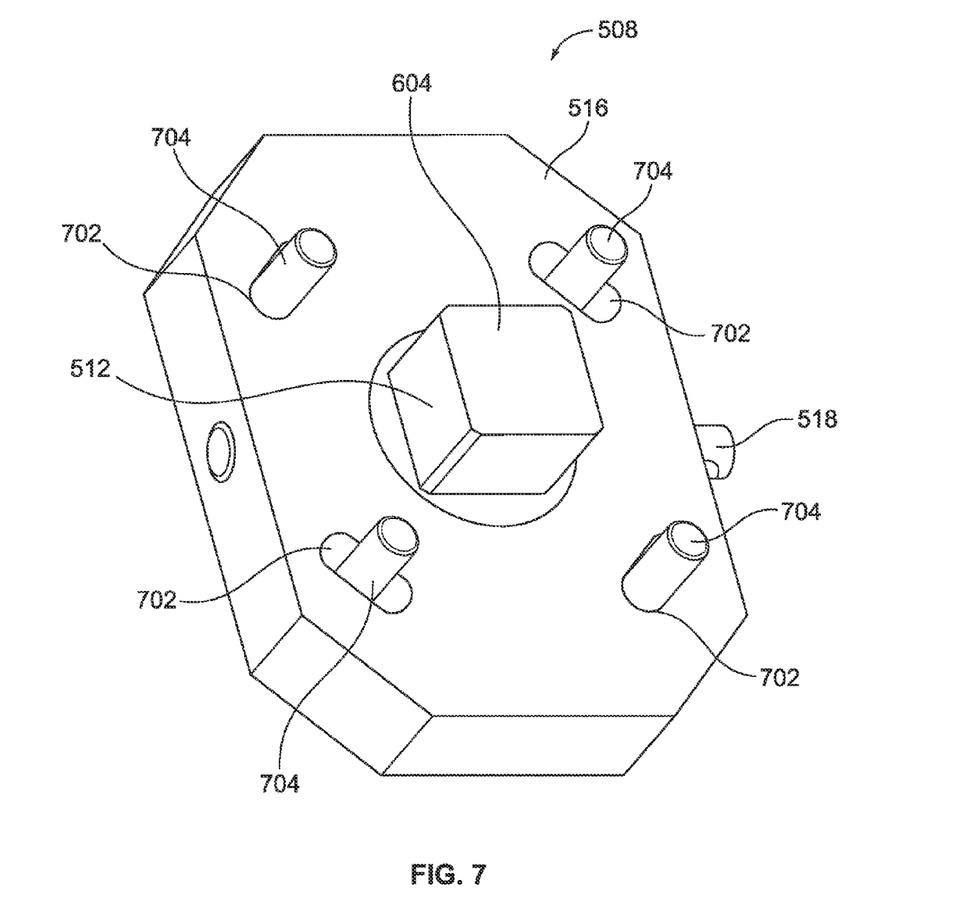
FIGS. 7 and 8 depict different views of the example lockout device of FIG. 5.

FIG. 7 depicts the example lockout device 508 including the insert 512, the mounting plate 516 and the locking pin 518. In this example, the first portion 604 has a substantially square cross-section configured to interact with or engage the splines 614 of the lever 602. The mounting plate 516 defines a plurality of slots 702 through which fasteners 704 extend to couple the lockout device 508 to the actuator 500. Because the zero position (e.g., closed position) of the valve to which the actuator 500 is coupled may vary (e.g., +/−7°), the position of the lever 602 may also vary (e.g., by +/−7°). Thus, by providing the mounting plate 516 with the slots 702 instead of circular apertures, the mounting position of the lockout device 508 relative to the actuator 500 may be varied (e.g., by +/−7 °) to enable the lockout device 508 to be used with various valve configurations, for example. The slots 702 may be defined by the mounting plate 516 in a square pattern or any other pattern to enable the lockout device 508 to be coupled to the actuator 500. While the mounting plate 516 defines four slots 702, any other number (e.g., 1, 2, 3, etc.) of slots may be defined instead. Alternatively, the slots 702 may be oversized through holes, for example.

Figure 8:
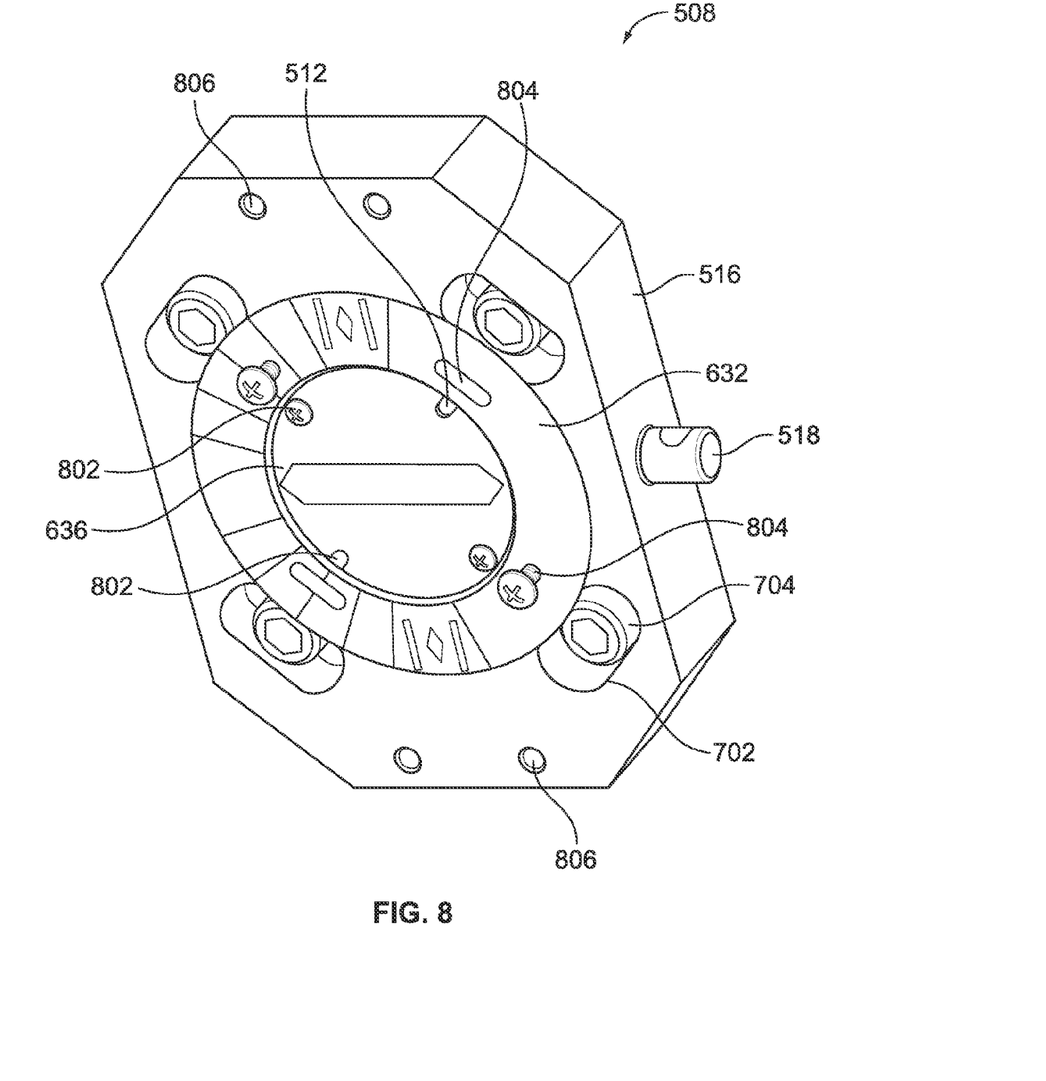

FIG. 8 depicts another view of the lockout device 508 including the insert 512 having the travel indicator 636 coupled thereto, the mounting plate 516 having the travel scale 632 coupled thereto and the locking pin 518. The travel indicator 636 may define a plurality of apertures or slots 802 to enable the travel indicator 636 to be coupled to the insert 512 differently depending on the configuration of the valve, for example. The travel scale 632 may define a plurality of apertures or slots 804 to enable the travel scale 632 to be coupled to the mounting plate 516 differently depending on the configuration of the valve, for example. In this example, the mounting plate 516 defines a plurality of mounting holes or apertures 806 to enable accessory devices to be mounted to the mounting plate and/or the actuator 500. The mounting holes 806 may have any suitable pattern and the mounting plate 516 may define any number of mounting holes (e.g., 1, 2, 3, etc.).

Figure 9:
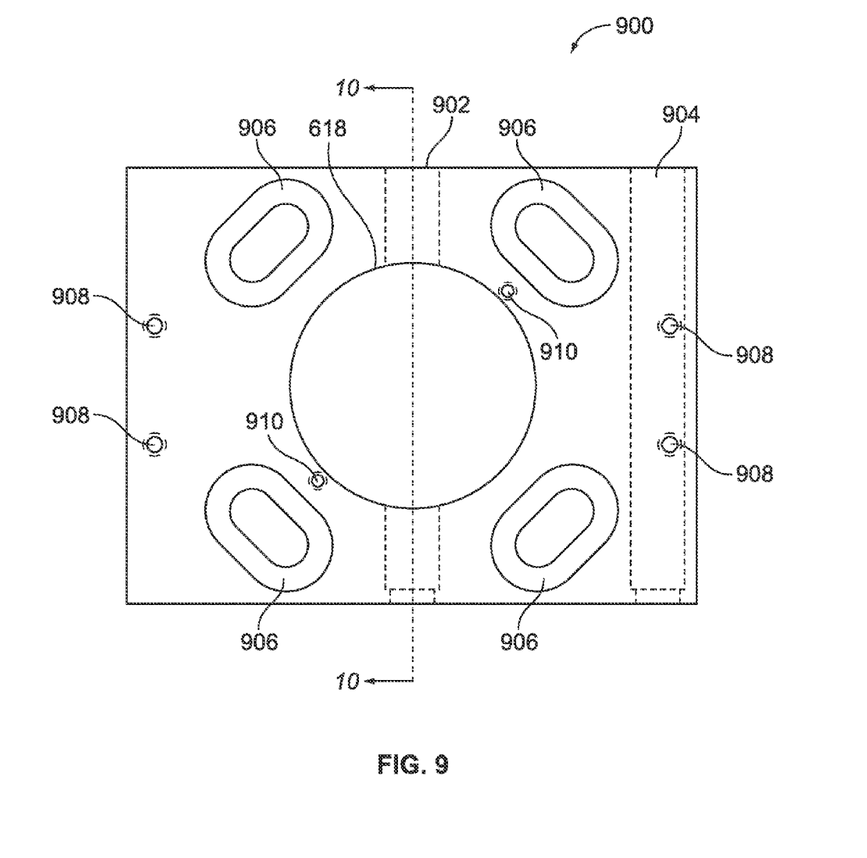
FIGS. 9-11 depict different views of an example mounting plate that can be used to implement the examples described herein.
Figure 10:
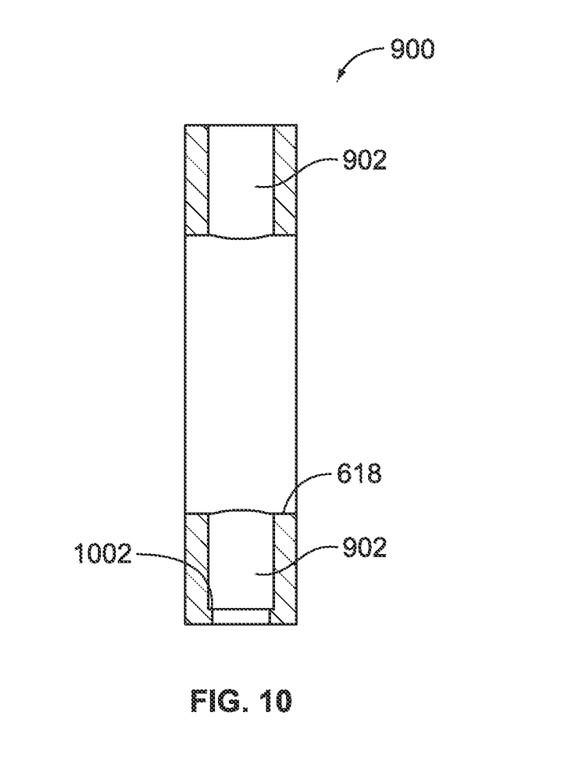
Figure 11:
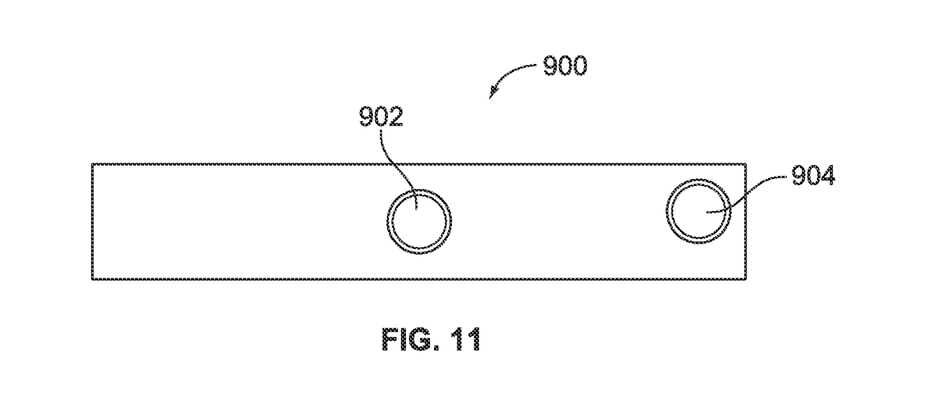

FIGS. 9-11 depict various views of an example mounting plate 900 that can be used to implement the examples described herein. The mounting plate 900 is similar to the mounting plate 516. However, the mounting plate 900 includes a first aperture 902 to receive a locking pin during a lockout procedure and a second aperture 904 to receive and store the locking pin during normal operation (e.g., not a lockout procedure). The mounting plate 900 includes a plurality of slots 906 to receive the fasteners 704 to enable the mounting plate 900 to be coupled to the actuator 500. The mounting plate 900 additionally includes a plurality of mounting holes 908 and 910 to enable accessory devices and/or the travel scale 632 to be coupled to the mounting plate 900, respectively.

As depicted in FIG. 10, a shoulder 1002 positioned within the first aperture 902 may be engaged by a corresponding shoulder of the locking pin 518.

As depicted in FIG. 11, to not interfere with the depth that the mounting holes 908 may be drilled, the second aperture 904 may be positioned on a different plane than the first aperture 902.

Figures 12, 13:
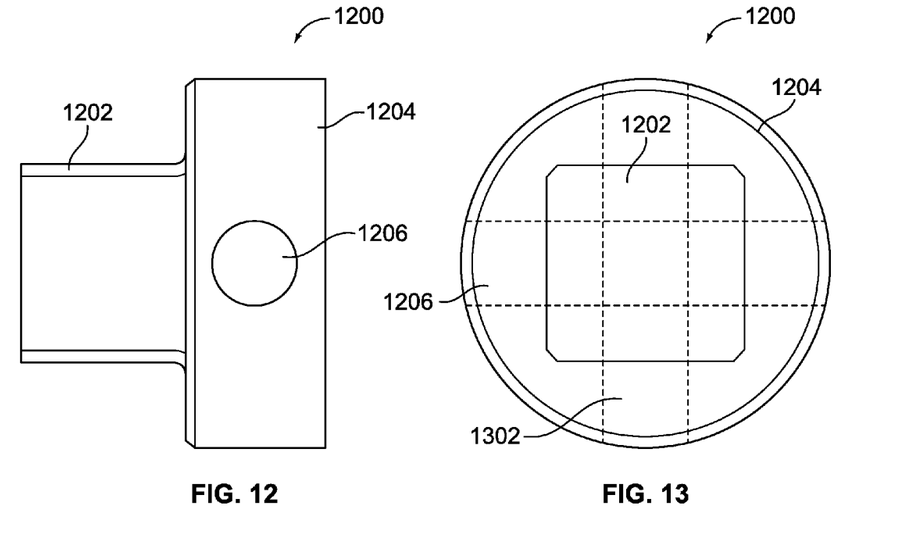
FIGS. 12-13 depict an example insert that can be used to implement the examples described herein.

FIGS. 12 and 13 depict different views of an example insert 1200 that can be used to implement the examples described herein. The insert 1200 includes a first portion 1202 to be positioned within an actuator lever and a second portion 1204 to be positioned within a mounting plate of the example locking device. As depicted in FIG. 12, the second portion 1204 defines an aperture 1206 that, when aligned with a corresponding aperture of a mounting plate, may receive a locking pin during a lockout procedure. As depicted in FIG. 13, the first portion 1202 may have a substantially square cross-section with chamfered corners and the second portion 1204 may have a substantially circular cross-section.

Figure 14:
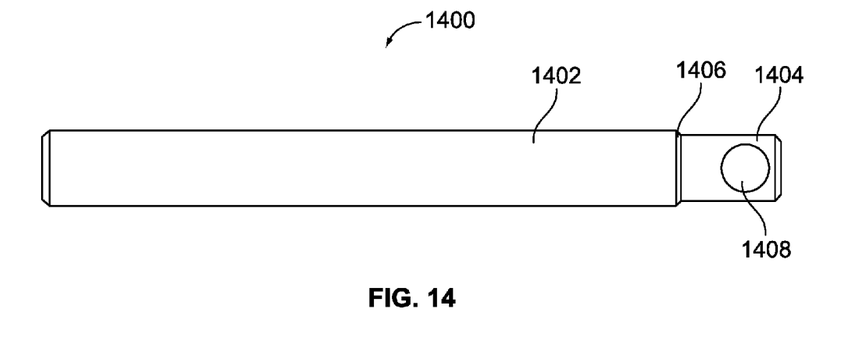
FIG. 14 depicts an example locking pin that can be used to implement the examples described herein.

FIG. 14 depicts an example locking pin 1400 that can be used to implement the examples described herein. The locking pin 1400 includes a larger diameter portion 1402 and a smaller diameter portion 1404 separated by a shoulder 1406. When the locking pin 1400 is inserted into a mounting plate and insert of the example lockout device, the shoulder 1406 may engage a corresponding shoulder of the mounting plate, for example. The smaller diameter portion 1404 defines an aperture 1408 through which a portion of a lock is positioned to prevent the locking pin 1400 from being from the mounting plate and the insert during a lockout procedure.

Figure 15:
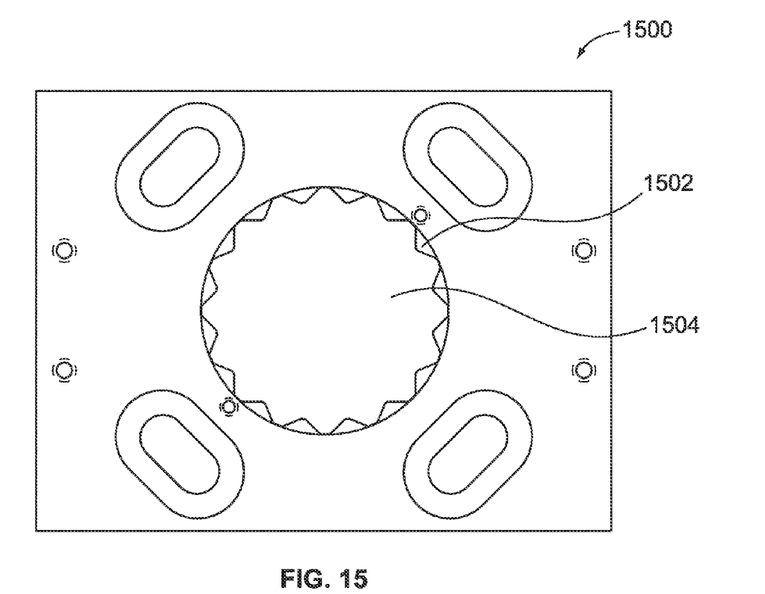
FIG. 15 depicts an alternative example mounting plate.

FIG. 15 depicts an alternative example mounting plate 1500 that can be used to implement the examples described herein. The mounting plate 1500 includes splines 1502 positioned within an aperture 1504 defined by the mounting plate 1500. In contrast to the examples described above, an insert (not shown) may only be positioned within the aperture 1504 and an adjacent actuator lever during a lockout procedure. During such a procedure, a first portion of the insert may be positioned within the actuator lever and a second portion of the insert may be positioned within the aperture 1504 to rotationally fix the actuator lever relative to the mounting plate 1500. The second portion of the insert may have a cross-section that interacts with at least some of the splines 1502 such that when the insert is positioned within the aperture 1504, rotation of the insert is substantially limited or prevented entirely. During normal operation, the insert is removed from at least the actuator lever 1500 to enable the actuator lever to rotate. While the mounting plate 1500 is depicted as having a circular aperture 1504, in other examples, the mounting plate 1500 may define an aperture having any other shape (e.g., square, triangular, etc.).

Figure 16:
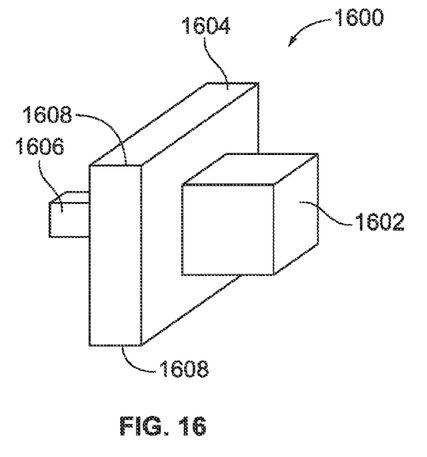
FIG. 16 depicts an alternative example insert.
Figure 17:
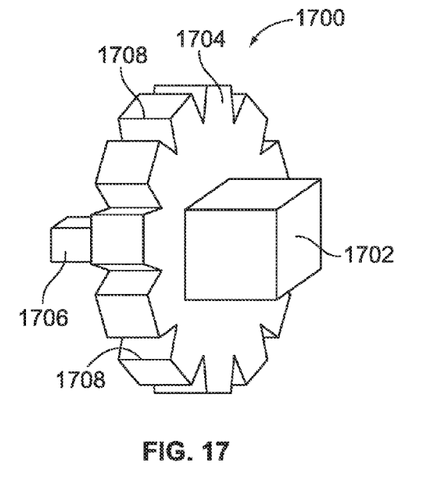
FIG. 17 depicts another alternative example insert.

FIGS. 16 and 17 depict example inserts 1600 and 1700 having respective first portions 1602 and 1702, respective second portions 1604 and 1704 and respective handles 1606 and 1706. During a lockout procedure, the first portions 1602, 1702 may be positioned within an actuator lever and the second portions 1604, 1706 may be positioned within the mounting plate 1500. Interaction between the first portions 1602, 1702 and the actuator lever and between corners 1608, 1708 or other surface structures of the inserts 1600, 1700 and the splines 1502 enables the actuator lever to be rotationally fixed relative to the mounting plate 1500. While two cross-sections of the second portions 1604 and 1704 are depicted, the second portions 1604 or 1704 may have any other suitable cross-sectional shapes (e.g., star, triangle, splines, etc.).

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A lockout device for use with a rotary actuator, comprising:
    an insert including a first portion to be inserted into a lever of a rotary actuator, the insert to interact with one or more features of the lever to enable rotational movement of the lever to be transmitted thereto, a second portion of the insert to extend from the lever, the second portion defining a first opening through which an object is to be inserted to rotationally fix the insert and the lever in a first position relative to a housing of the rotary actuator; and
    a plate to be coupled to the housing of the rotary actuary, the second portion of the insert being at least partially positioned within an aperture defined by the plate, the first portion of the insert extending from the plate.

2. The lockout device of claim 1, further comprising a retainer coupled to the plate to retain the insert at least partially within the aperture.

3. The lockout device of claim 2, wherein the retainer comprises a scale indicative of an amount of rotation of the insert and the lever.

4. The lockout device of claim 3, further comprising a travel indicator coupled to the insert to indicate the amount of rotation of the insert and the lever.

5. The lockout device of claim 1, wherein the plate defines a second opening through which the object is to be inserted when the first and second openings align to rotationally fix the insert and the lever in the first position.

6. The lockout device of claim 5, wherein the object comprises a key or pin and the first and second openings comprise slots into which the key or pin is to be inserted when the slots align to rotationally fix the insert and the lever in the first position.

7. The lockout device of claim 5, wherein the object comprises a pin and the first and second openings comprise apertures into which the pin is to be inserted when the apertures align to rotationally fix the insert and the lever in the first position.

8. The lockout device of claim 7, wherein the pin defines a hole through which a portion of a fastening device is to be positioned to prevent the pin from being removed from the aligned apertures of the insert and the plate.

9. The lockout device of claim 1, wherein the plate defines a plurality of slots through which fasteners are to extend to couple the plate to the housing of the rotary actuator.

10. The lockout device of claim 1, wherein the plate defines a plurality of apertures to enable one or more accessory devices to be mounted thereto.

11. The lockout device of claim 1, wherein the second portion defines a second opening through which the object is to be inserted to rotationally fix the insert and the lever in a second position relative to the housing of the rotary actuator, the second position being different than the first position.

12. The lockout device of claim 1, wherein the second portion defines a second opening to receive and store the object during normal operation of the rotary actuator.

13. The lockout device of claim 1, wherein the first portion of the insert comprises chamfered edges to enable insertion into the lever.

14. A lockout assembly to be used with a rotary actuator, the lockout assembly comprising:
    a plate to be coupled to a housing of a rotary actuator, the plate defining an aperture therethrough and a slot; and
    an insert including a first portion and a second portion, the first portion to be inserted into a lever of the rotary actuator and the second portion to be positioned within the aperture, the insert having an exterior surface configured to engage the lever to enable rotational movement of the lever to be transmitted thereto, the second portion defining a slot to be aligned with the slot of the plate to enable an object to be inserted into the slots to prevent rotational movement of the insert and the lever relative to the plate.

15. The lockout assembly of claim 14, further comprising a retainer coupled to the plate to retain the insert at least partially within the aperture.

16. The lockout assembly of claim 14, wherein the slot of the plate comprises a shoulder to be engaged by a shoulder of the object to be inserted into the slot to prevent further movement of the object within the slot in at least one direction.

17. The lockout assembly of claim 14, wherein the cross-section comprises a substantially square cross-section.

18. The lockout assembly of claim 14, further comprising the object.

19. The lockout device of claim 14, wherein the insert comprises a plurality of edges to be received by splines positioned within the aperture of the plate.

20. A rotary actuator, comprising:
    a housing;
    a lockout device comprising an insert; and
    a lever disposed within the housing, the lever comprising a first aperture to receive a shaft associated with a valve on a first side of the lever and a second aperture to receive the insert on a second side of the lever, the first and second apertures coaxially aligned, the insert to interact with the lever and an opening in the housing to rotationally fix the insert and the lever during a lockout procedure, wherein a portion of the housing through which the opening is defined comprising a plate, the insert being at least partially positioned within an aperture defined by the plate.

21. The rotary actuator of claim 20, wherein the plate is integrally coupled to the housing.

22. The rotary actuator of claim 20, wherein the plate is to be coupled to the housing.

* * * * *